Patented Oct. 25, 1949

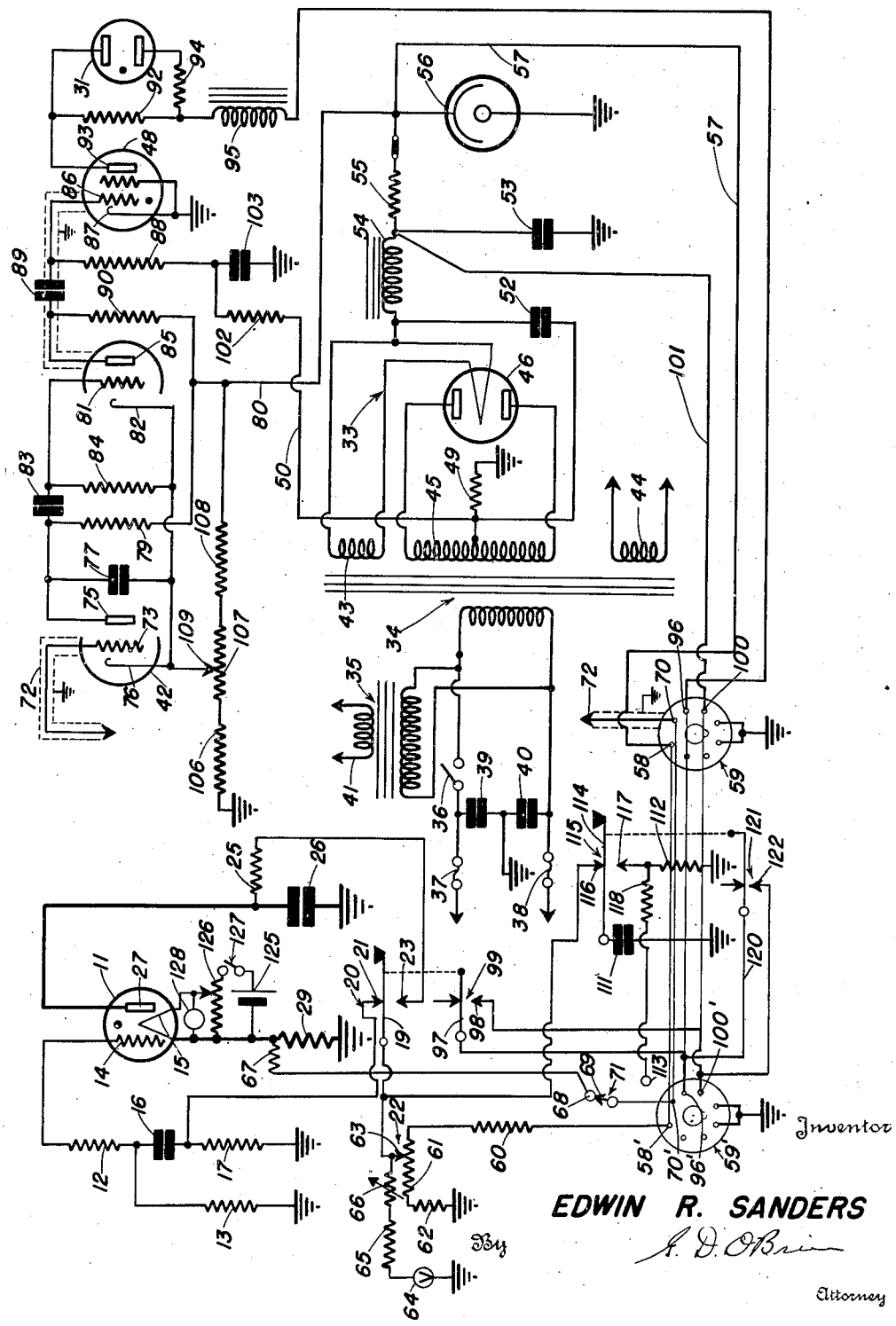

2,485,924

UNITED STATES PATENT OFFICE 2,485,924

TESTER FOR ELECTRONIC DISCHARGE DEVICES

Edwin R. Sanders, Silver Spring, Md., assignor to the United States of America as represented by the Secretary of the Navy Application August 5, 1947, Serial No. 766,249

4 Claims. (Cl. 315—368)

The present invention relates to testing devices and circuits and more particularly to tube testers for measuring the peak output pulse signal of an electronic discharge device which is caused to become conductive and fire under predetermined conditions. While the invention has a wide range of prospective application it is of particular utility in testing the surge transient characteristics of a grid-controlled gas-filled tube and it is described in that connection.

It is an object of the present invention to provide an improved device of the character indicated for quality-control production testing of electronic discharge devices.

Other and further objects of the invention together with the novel features believed to be characteristic thereof will be evident from a consideration of the following specification, the claims appended thereto and the accompanying drawings, to all of which reference is made for an understanding of the present invention.

The single figure of the drawing is a circuit schematic of a preferred embodiment of tube tester in accordance with the present invention. While it is not proposed that the invention be limited to any specific circuit dimensions, those appearing in parentheses following the various circuit elements hereinbelow mentioned are furnished for purposes of illustration, they having been found practicable in one successful embodiment of the invention.

The embodiment shown comprises a control unit and an indicator unit. The control unit includes means for applying a predetermined decreasingly negative biasing potential to the grid of a "Thyratron" 11 under test. This means includes a series-connected pair of resistors 12 (100,000 ohms) and 13 (1 megohm) connected between control electrode 14 and ground. Filamentary cathode 15 is grounded to complete the tube input circuit. A biasing potential is produced between the control grid and the cathode in the following manner: A series combination of a capacitor 16 (0.1 microfarad) and a resistor 17 (5 megohms) is connected between the junction of resistors 12, 13 and ground. When a switch 20 is in the "Standby" position and its blade 19 is closed on a contact 21 a voltage from a voltage divider 22 appears across resistor 17 and therefore across the terminals of an R.-C. time-constant circuit comprising capacitor 16 and resistor 13. Capacitor 16 is so charged that its plate electrically adjacent to switch 20 becomes positive and its plate electrically adjacent to resistor 13 becomes negative. During this "Standby" condition blade 19 of the switch is out of contact with a contact 23, so that no anode voltage is applied to tube 11 from voltage divider 22, which also serves as the energy source for the anode of that tube, and the tube is accordingly nonconductive.

When members 19 and 21 of switch 20 are electrically separated and when blade 19 is keyed into contact with contact 23 two significant phenomena occur. The breaking of the circuit between resistor 17 and voltage divider 22 causes a substantial negative bias to be imposed on grid 14 by reason of the charge on capacitor 16. Electrons from the negative plate of the capacitor flow from the junction of resistors 12 and 13 through resistor 13 to ground and then through resistor 17 to the positive plate of the capacitor as the capacitor discharges. This loss of capacitor charge causes a decreasingly negative bias to be impressed on grid 14 until the tube becomes conductive.

The keying of switch 20 to the "Firing" position imposes a voltage from voltage divider 22 across an R.-C. time-constant circuit comprising a resistor 25 (100,000 ohms) and a capacitor 26 (0.9 microfarad) and the voltage across capacitor 26 accordingly increases. The anode of tube 11 is connected to the junction of resistor 25 and capacitor 26 so that the last-mentioned voltage also appears between anode 27 and cathode 15. The anode potential therefore becomes increasingly positive and the grid also becomes more positive but at a lower rate so that the anode reaches its operating potential before the grid fires the tube. When the tube fires capacitor 26 discharges through a time-constant circuit comprising capacitor 26, the output circuit impedance of tube 11 existing between anode 27 and cathode 15, and a surge resistor 29 (10 ohms) connected between cathode and ground to complete the capacitor discharge path. Upon firing of tube 11 a surge-transient or pulse signal appears across resistor 29. This resistor simulates a device, such as an ignition wire, included in the work circuit of a "Thyratron," such as the tube 11, when the tube is employed for detonating a projectile, for example. That is, it is desirable to determine whether "Thyratrons" to be used in such applications satisfy specifications for the generation of a short peak pulse of predetermined sufficient amplitude across resistor 29. This determination is made in production testing by observing whether or not a given "Thyratron" under test produces a signal which, appropriately modified, causes an indicator lamp 31 (1 watt neon) to glow. The time-constant circuits coupled to the input and output circuits of each tube under test are so preset as to impose standard firing conditions on all tubes of the same type tested. Conformity to the specification is determined by an observation as to whether or not any particular tube causes lamp 31 to glow.

The voltage appearing across voltage divider 22 is produced by a conventional power supply 33. This supply comprises transformers 34 and 35, having their primary windings connected in parallel and suitably connected to a 110 volt, 60 cycle, alternating current source (not shown) by an arrangement including a switch 36, fuses 37 and 38, and by-pass capacitors 39 and 40 (each 0.1 microfarad). Transformer 35 has a secondary winding 41 for furnishing filament current to a tube 42 and transformer 34 has secondary windings 43, 44 and 45, winding 43 being employed for furnishing filament currents to a full wave rectifier, such as diode 46, winding 44 being provided for furnishing filament currents to a tube 48 and winding 45 being the high voltage winding for the full-wave rectifier. A center tap on winding 45 is connected to ground through a resistor 49 (200 ohms), in order to make a substantial negative voltage (8.5 volts) available between conductor 50 and ground. The positive end of the high-voltage output of the rectifier is taken from the filament side of tube 46. The high-potential circuit of the rectifier is coupled to a filtering section comprising shunt capacitors 52 and 53 (each 8 microfarads) and a series choke 54 (20 henries). The filter output circuit is coupled to a resistor 55 (5,000 ohms) and a voltage regulating tube 56 (VR150). A high potential (150 volts) lead 57 is taken from the anode of tube 56 and connected to terminal 58 of plug 59, this terminal being designed to mate with a complementary terminal 58' in a socket 59' and to impress the high voltage (150 volts) across a series combination of resistor 60 (15,000 ohms) resistor 61 (25,000 ohms) and resistor 62 (10,000 ohms) included in voltage divider 22. A sliding contact 63 on the voltage divider is coupled to blade 19 of keying switch 20.

In order to permit the observation of the voltage divider output voltage a series combination of an ammeter 64 (1 milliampere movement) graduated to read in volts (0 to 80 volts), resistor 65 (63,000 ohms) and variable calibrating resistor 66 (10,000 ohms) is connected across the output terminals of the divider; that is, between slider 63 and ground. The amplitude of the pulse appearing across resistor 29 is investigated by applying this pulse to an indicator circuit which has a high known negative bias on the control grid of an included tube such as tube 42. If the pulse has sufficient amplitude, it overcomes this bias and operates the indicator, such as glow tube 31, thus providing a "yes or no" answer. This bias is obtained by operation of the cathode of tube 42 considerably positive with respect to ground.

In order to apply the output pulse signal of tube 11, appearing across resistor 29, to the control electrode of the first triode of tube 42, as above described there is provided a coupling circuit comprising resistor 67 (100 ohms), contact 68 and blade 69 of a switch 71 contact 70' of socket 59', mating contact 70 of plug 59 and shielded cable 72, the main conductor of the latter being connected to control electrode 73 and the shield being grounded. The damping resistor 67 is placed electrically near to the pulse generator in order to prevent the effect of undesired reflection and building up of voltages along the line connecting the generator to the indicating portion of the testing device including tube 42.

The potential of the pulse applied to control electrode 73 when tube 11 fires is positive and, if tube 11 meets the specifications, renders the first triode section of tube 42 (6N7) conductive. The pulse from tube 11 causes the generation of a pulse of relatively great duration (required to ionize and fire tube 48) by a circuit including the first half of tube 42. This pulse is amplified and its polarity is reversed by a circuit including the second half of the tube. The resultant pulse is sufficiently amplified, of a sufficiently great duration, and of the correct polarity, to trigger tube 48 (2051 "Thyratron"). The discharge current of tube 48 is sufficient to cause lamp 31 to glow, indicating that the tube under test satisfactorily meets the specified surge-transient characteristic requirements. Specifically, there is shunted across the output circuit of the first half of tube 42, including anode 75 and cathode 76, a capacitor 77 (0.0025 microfarad). When this portion of tube 42 becomes conductive capacitor 77 discharges through the circuit comprising elements 77, 76 and 75 and the cathode-anode impedance between elements 75 and 76. A second pulse of relatively great duration as compared to that of the pulse from tube 11 is produced since, when the first half of tube 42 becomes nonconductive at the end of the first pulse capacitor 77 slowly charges from the power supply source through a time-constant circuit comprising element 77 and resistor 79 (20 megohms), conductor 80 being connected to the power supply for this purpose. This pulse of relatively great duration is applied to the input circuit of the other half of tube 52, specifically to control electrode 81 and cathode 82, by a coupling circuit comprising resistor 79, capacitor 83 (0.01 microfarad) and resistor 84 (10 megohms). The second half of the tube amplifies and inverts the pulse from the first half with the result that a pulse signal of positive polarity appears between anode 85 and ground. The amplified pulse is applied to the input electrodes 86, 87 of tube 48 by a coupling network comprising resistor 90 (1 megohm), resistor 88 (1 megohm), and capacitor 89 (.01 microfarad), the conductors in this network being shielded. For the purpose of supplying electricity to the anodes of the two halves of tube 42 the individual terminals of resistors 79 and 90 remote from anodes 75 and 85, respectively, are connected by conductor 80 to the high voltage source (150 volts). The pulse applied to the input electrodes of tube 48 causes this tube to become conductive and the discharge current thereof flows through a resistor 92 (500,000 ohms) included in its output circuit and in series with anode 93. Lamp 31 is shunted across resistor 92 and the resultant potential drop appearing thereacross causes the lamp to glow. A resistor 94 (75,000 ohms) is included in the shunt and in series with lamp 31.

Anode energization is supplied to tube 48 by a circuit comprising resistor 92, choke 95 (30 henries), terminal 96 of plug 59, complementary terminal 96' of socket 59', blade 97 and contact 98 of keying switch 99, terminal 100' of socket 59', terminal 100 of plug 59 and conductor 101, the latter being connected to a high potential terminal of the power supply (400 volts).

When switch 20 is in the "Standby" position switch 99 is open, appropriate mechanical ganging linkages indicated by a dashed line being provided for that purpose. This mechanical linkage is necessarily so arranged that switch 99 closes slightly before switch 20 when switch 20 is keyed to the firing position, thereby to apply anode voltage to tube 48 prior to firing of the tube under test. Opening of switch 99, as when switch 20 is in the "Standby" position, extinguishes indicator lamp 31.

Tube 48 is biased to a nonconductive state for the no-signal condition by a biasing circuit comprising conductor 50 (8.5 volts negative), resistor 102 (500,000 ohms), capacitor 103 (0.1 microfarad), and resistor 88 (1 megohm).

The control grids of both triodes of tube 42 are negatively biased by reason of positive potentials impressed on their cathodes by a voltage divider comprising resistors 106, 107 and 108, these resistors being connected as a series combination between a high potential (150 volts) terminal of regulator tube 56 and ground, and a sliding contact 109 on variable resistor 107 connected to the junction of cathodes 76 and 82. This contact is used to adjust the bias of tube 42 to such a value that pulses of the desired amplitude just barely trip the indicator.

It has been found in one successful embodiment of the present invention that six separate indicator channels embracing elements corresponding to tubes 42, 48 and 31 and their associated circuits may be provided in the indicator unit. Only one of these channels is illustrated in the embodiment selected for description herein. Suitable circuit dimensions for each of these channels are as follows:

| Indicator Lamp | Resistor 106 | Resistor 107 | Resistor 108 |
| --- | --- | --- | --- |
| | Ohms | Ohms | Ohms |
| 27 volts | 3,000 | 5,000 | 35,000 |
| 35 volts | 6,000 | 5,000 | 30,000 |
| 40 volts | 7,500 | 5,000 | 30,000 |
| 43 volts | 10,000 | 5,000 | 30,000 |
| 46 volts | 10,000 | 5,000 | 27,000 |
| 50 volts | 10,000 | 5,000 | 25,000 |

Other circuit elements include means for applying a predetermined filament voltage to cathode 15 of tube 11. This means comprises a battery 125 (1.5 volts), a resistor 126 (50 ohms), an on-off switch 127, and a voltmeter 128 (0–2 volts).

In operation a thyratron to be tested is placed in a socket (not shown) provided for the reception of tube 11. Switch 20 is placed in the standby condition at which capacitor 16 becomes charged and at which time no energization is imposed on anode 27. Moreover, the anode circuit of tube 48 is also open and lamp 31 is off. After an appreciable interval switch 20 is keyed (depressed) to the firing position and the following sequence of events occurs. The discharge of capacitor 16 through resistor 13 and resistor 17 applies a decreasing negative bias at the grid of tube 11. With the closing of switch 20 positive anode voltage is applied rapidly to tube 11 through the short time constant circuit which includes resistor 25 and condenser 26. When the grid bias voltage drops sufficiently tube 11 discharges and a surge-transient pulse appears across resistor 29. This pulse is applied to tube 42 and there if sufficiently large is converted into a negative pulse of relatively great duration, which pulse is amplified and inverted in polarity and applied to the input of tube 48. The pulse so applied to that tube overcomes the negative bias thereof and permits the tube to become conductive, with the result that a discharge current flows in resistor 92 and causes lamp 31 to glow. This glow occurs if the input pulse to tube 42 is sufficient to cause the first section of that tube to become conductive. It will be observed that the triggering of tube 42 is dependent upon the characteristics of the tube under test as well as upon the setting of slider 109 on resistor 107 (and the resultant bias on tube 42) and the setting of slider 63 on resistor 61 (and the resulting charging potential applied to condenser 26). The latter two factors are predetermined and preset in order to establish a given set of conditions which the tube under test must meet. If the test is met lamp 31 so indicates by reason of its glow. If not, the lamp does not glow.

By a setting of slider 109 on resistor 107 the bias on the grid of the first section of tube 42 is so controlled that that tube may be adjusted to respond to pulses of various peak magnitudes depending upon the specified peak pulse of the tube under test.

In order to calibrate the tester so that the indicating lamp responds to voltage pulses within the tolerances permitted the tube under test, there is provided a calibration arrangement. A dummy pulse generator (simulating capacitor 26, the cathode-anode discharge path of a tube 11 meeting the required conditions and resistor 29) is provided by a pulse generator comprising a capacitor 111 (0.01 microfarads) and a resistor 112 (1000 ohms). Units 111 and 112 constitute a dummy or standard pulse generator. The indicator unit (comprising tubes 42, 48 and 31) and voltage divider 22 are so adjusted that this standard pulse generator cause the indicator lamp to glow. If, following such calibration, a tube under test also causes the lamp to glow then it meets the specifications. For purposes of calibration, blade 69 of switch 71 is placed in contact with contact 113. This disconnects tube 11 from the tubes in cascade therewith and renders the behavior of the latter tubes subject to the action of the dummy pulse generator. Switches 20 and 99 are permitted to remain in the stand-by condition during the calibration process. Blade 114 of a keying switch 115 is placed in contact with contact 116, thus applying a known output voltage from voltage divider 22 to capacitor 111. Thereafter blade 114 is placed into contact with contact 117, introducing resistor 112 (1000 ohms) across the terminals of capacitor 111. This capacitor discharges and generates a pulse which is applied through the circuit comprising damping resistor 118 (100 ohms), contact 113, blade 69 of switch 71, contact 70' of socket 59', contact 70 of plug 59 and cable 72 to the control electrode of tube 42. This pulse has an amplitude equal to the known output voltage from voltage divider 22 from which capacitor 111 was charged. Sliders 109 (on resistor 107) and 63 (on resistor 61) are so pre-set that the application of this pulse to control electrode 73 is just barely sufficient to cause the sequence of events which will be evident from the above description making tube 31 glow. During the calibration operation blade 120 of switch 121 is placed into contact 122 slightly before blade 114 of switch 115 touches contact 107, appropriate mechanical linkages (not shown and represented by a dashed line) between switches 115 and 121 being provided for this purpose. The operation of switch 121 during the calibration operation is the same as that of switch 115 during the testing operation. It closes the circuit between the power supply (terminal 96) and the anode of tube 48.

While there has been shown and described what is at present considered to be the preferred embodiment of the invention, it will be evident to those skilled in the art that various changes and modifications may be made therein without departing from the true scope thereof. The invention, therefore, is defined solely in and by the following claims.

What is claimed is:

1. The process of testing a gas-containing discharge tube having a cathode, a control electrode and an anode, which consists in applying between the cathode and control electrode a biasing voltage that is a decreasing function of time such that said control electrode has a decreasing negative bias, simultaneously applying between cathode and anode voltage that is an increasing function of time and of proper polarity to make the anode increasingly positive to the cathode, whereby a discharge occurs when said bias and said anode voltage jointly attain critical values, and causing said discharge to reveal its occurrence.

2. A circuit for testing a gas-containing discharge tube having a cathode, a control electrode, and an anode, said circuit comprising a power source, a capacitor connected between cathode and control electrode of the tube under test, a resistor providing a permanently closed high resistance discharge path for said capacitor, a conductor connecting said capacitor to the power source, normally maintaining a suitable negative bias voltage on the control electrode and keeping the capacitor charged, a switch in said conductor which when opened prevents such charging whereupon the capacitor discharges through said high resistance path at a controlled rate, thus correspondingly reducing the bias of the tube, a second capacitor connecting the anode to the cathode, a conductor connecting the anode to a suitable positive high voltage point of the power source, a switch and a high resistance resistor in series in said last-named conductor, whereby said second capacitor may be charged to a suitable positive potential at a rate controlled by said series resistor, a resistor in the cathode circuit of the tube, an amplifier having its input side connected to the terminals of said resistor, and an indicating device connected to the output side of the amplifier.

3. A testing circuit as defined in claim 2, including additionally an auxiliary circuit, comprising a capacitor, a resistor and a switch for connecting said auxiliary circuit temporarily into the testing circuit, to simulate a pulse generator of standard characteristics, for calibrating the testing circuit.

4. A testing circuit as defined in claim 2, including additionally a standard pulse generator comprising a resistor and a capacitor, and a two-way switch whereby either the tube to be tested or the standard pulse generator may be connected into the testing circuit.

EDWIN R. SANDERS.

REFERENCES CITED

The following references are of record in the file of this patent:

"Theory and Application of Electron Tubes," by H. J. Reich, pp. 641–644.